(12) United States Patent
Salameh

(10) Patent No.: US 7,063,327 B2
(45) Date of Patent: Jun. 20, 2006

(54) SEALING ELEMENT

(75) Inventor: Ralf Salameh, Gondelsheim (DE)

(73) Assignee: Federal Mogul Sealing Systems Bretten GmbH & Co.KG, (DE)

(*) Notice: Subject to any disclaimer, the term of this patent is extended or adjusted under 35 U.S.C. 154(b) by 94 days.

(21) Appl. No.: 10/675,750

(22) Filed: Sep. 30, 2003

(65) Prior Publication Data

US 2004/0135323 A1    Jul. 15, 2004

(30) Foreign Application Priority Data

Oct. 11, 2002  (DE) ................ 102 47 559

(51) Int. Cl.
*F02F 11/00*  (2006.01)
*F16L 17/06*  (2006.01)
*F16J 15/02*  (2006.01)

(52) U.S. Cl. ............ 277/590; 277/593; 277/596; 277/606; 277/609; 277/626; 277/628; 277/630; 277/637; 277/639; 277/644; 277/648; 277/651

(58) Field of Classification Search .......... 277/590, 277/593, 596, 598, 606–609, 612, 626–627, 277/628, 630, 637, 639, 644, 648, 651
See application file for complete search history.

(56) References Cited

U.S. PATENT DOCUMENTS

| | | | | |
|---|---|---|---|---|
| 3,794,333 A | * | 2/1974 | Czernik et al. | 277/593 |
| 4,535,996 A | * | 8/1985 | Cardis et al. | 277/313 |
| 4,625,979 A | * | 12/1986 | Inciong | 277/596 |
| 4,688,809 A | * | 8/1987 | Deppe | 277/594 |
| 5,322,299 A | * | 6/1994 | Terai | 277/596 |
| 5,615,898 A | * | 4/1997 | Clark et al. | 277/596 |
| 5,662,337 A | * | 9/1997 | Surbrook et al. | 277/594 |
| 5,681,048 A | * | 10/1997 | Tronel | 277/592 |
| 6,070,882 A | * | 6/2000 | Abe et al. | 277/592 |
| 6,460,859 B1 | * | 10/2002 | Hammi et al. | 277/596 |
| 6,543,787 B1 | * | 4/2003 | Inciong | 277/593 |
| 6,595,525 B1 | * | 7/2003 | Schmidt | 277/630 |

FOREIGN PATENT DOCUMENTS

| | | |
|---|---|---|
| DE | 3724515 C2 | 11/1993 |
| JP | 08-28707 | 8/1996 |
| WO | WO 99/132248 * | 3/1999 |

OTHER PUBLICATIONS

Publication BR 2789 US, from the journal Kautschuk Rubber Plastics, entitled "Elastomeric Shaped Seals for Stationary Components on the Motor," Volumn 46, No. 12/93, pp. 983-988.

* cited by examiner

*Primary Examiner*—Vishal Patel
(74) *Attorney, Agent, or Firm*—Howard & Howard

(57) ABSTRACT

A sealing element, especially a flat seal, consisting of a metal-supported elastomer material, containing sealing profiles that are offset form one another, between which, at given intervals, elements that provide acoustic de-coupling, also made of elastomer material, are located.

11 Claims, 2 Drawing Sheets

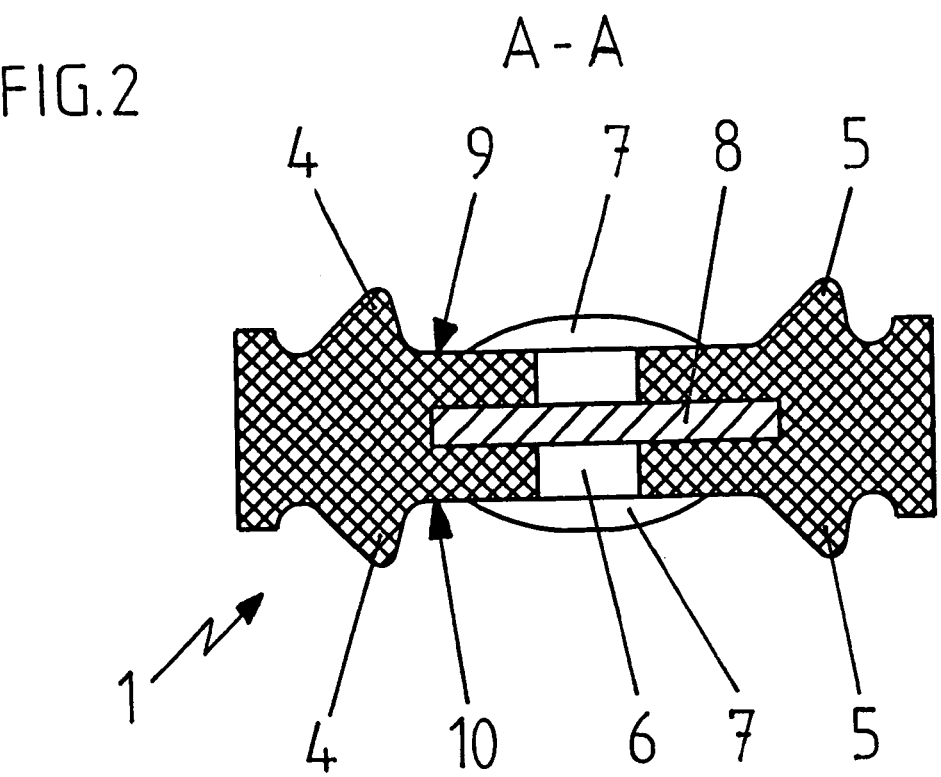
FIG.2 A-A
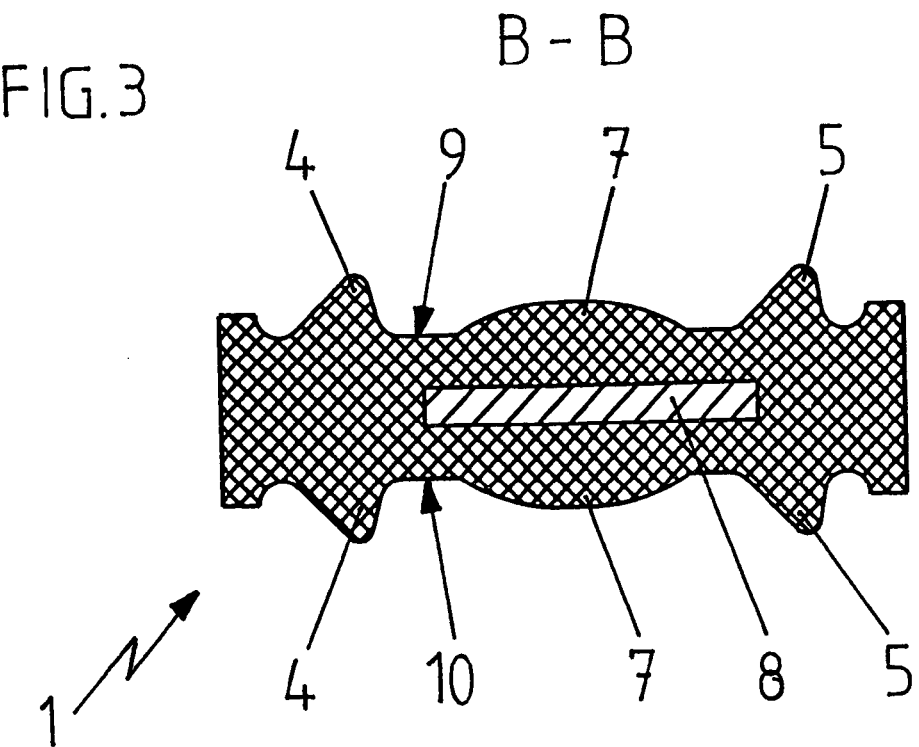
FIG.3 B-B

SEALING ELEMENT

This application claim the benefit of German Application No. 102 47 559.8 filed Oct. 11, 2002.

BACKGROUND OF THE INVENTION

1. Technical Field

The invention is a sealing element, particularly a flat seal.

2. Related Art

Seals between housing-type components of internal combustion engines, particularly those made of elastomeric materials, must nowadays meet a host of criteria that extend well beyond their actual sealing function. Product development considers the special geometric conditions of the installation site, in addition to the specific material properties of the elastomers and the media pressures that occur. Particularly, vibrations in the components, here particularly resonance bodies such as housing covers, cylinder head covers, or oil covers, can lead to unpleasant noise development. In order that the vibrations of the internal combustion engine are not transmitted to the components, or only after being damped, it is generally typical to provide elastomeric sealing profiles in the area of the components, which then provide acoustic de-coupling of the components. Through this means, the noise development can often be reduced considerably. Also, on the basis of new legal requirements in the area of noise emissions by motor vehicles, the components on the motor must be acoustically de-coupled. One seal shape that is used especially for acoustic de-coupling of housing covers is the elastomeric seal with a T-profile. This shaped seal is able, due to its tall sealing elastomeric height, to bridge a wide range of measurement and shape tolerances to the surrounding components. The large compression path of the seal makes possible very good smoothing out of uneven areas.

In order to meet the shape stiffness of mating seals, it is suggested in the essay "Elastomeric Shaped Seals for Stationary Components on the Motor" from the journal Kautschuk Rubber Plastics, Volume 46, No.12/93, pages 983 to 988, that the pure elastomer seals be stiffened.

For these stiffened seals, the elastomer is vulcanized onto or around a solidframe, made of, for example, aluminum, steel sheet metal, or plastic.

In addition to T-shaped seals, flat seals that have sealing profiles on their edges are also mentioned in the essay. Various types of seals are described that contain a support frame or to which a support frame is fastened. This support frame always serves as a stiffener or a spacing element for the elastomer seal. The essay does not mention that the support frame can be used to achieve a targeted influence on the hardness of the seal.

DE-C 372 45 15 contains a flat seal consisting of a flat support made of sheet metal with a sealing coating applied using a screen printing process that can be compressed in its thickness and has a mesh-like structure. The seal contact in this case is to be made as a grid with six-sided web-shaped grid openings and flanges, and cover the entire support.

JP-A 00 080 28707 contains a flat seal that is provided with spaced pass-through openings, where raised spots somewhat like lenses are arranged between individual pass-through openings. These elements, however, serve exclusively the purpose of sealing.

SUMMARY OF THE INVENTION

A sealing element, especially a flat seal, consisting of a metal-supported elastomer material, containing sealing profiles that are offset from one another, between which, at given intervals, elements that provide acoustic de-coupling, also made of elastomer material, are located.

The invention addresses the task of making a sealing element that has a simple construction in the presence of any acoustic de-coupling, and can also be made and unmolded simply.

This task is solved by a sealing element, especially a flat seal, consisting of an elastomer material that is possibly supported by metal, containing spaced sealing profiles between which, in pre-defined spacing, elements that are also made of elastomer material are present.

Advantageous developments of the invention are to be found in the sub-claims.

The elements that provide acoustic de-coupling, which are advantageously shaped like hemispheres, are located between two, particularly sealing, profiles. In addition to simple deformation, these hemispherical elements, due to their geometry, develop an ever-increasing load under pressure. The quantity and distribution of the geometry across the surface can influence the system. The balance between sealing functions and acoustic de-coupling can be improved through targeted influence.

In addition, it is also possible to reduce the material usage in the sealing element, with respect to the amount of elastomer needed. The invention is shown in the drawing using an application example. Shown are:

BRIEF DESCRIPTION OF THE DRAWINGS

FIG. 2 is a section through the sealing element, per FIG. 1, at section A—A; and FIG. 3 is a section through the sealing element, per FIG. 1, at section B—B.

DETAILED DESCRIPTION OF THE INVENTION

Figure 1:
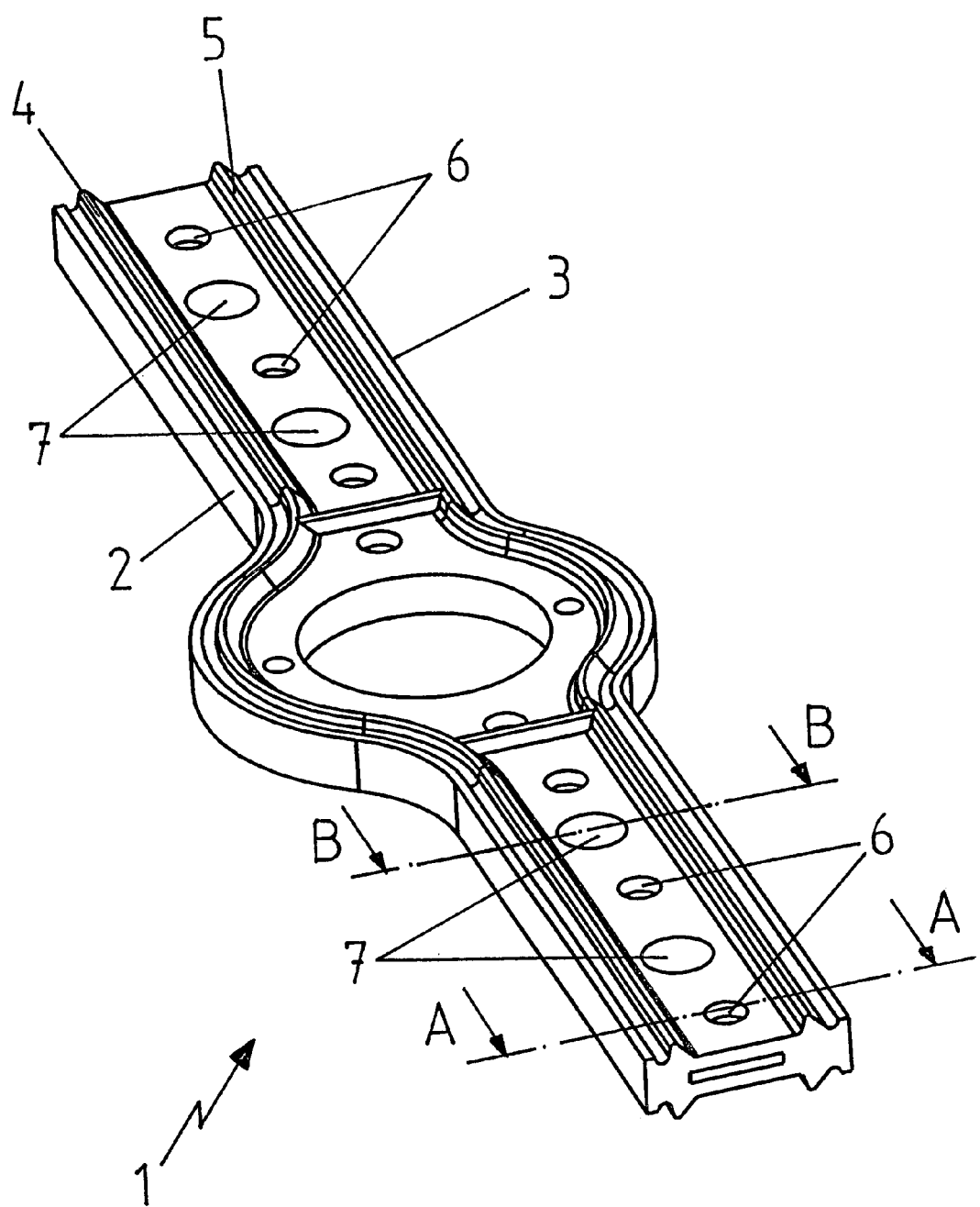
FIG. 1 is a partial section through an elastomeric sealing element.

FIG. 1 shows, in partial section, sealing element 1, made of elastomer material. This has sealing profiles 4, 5 in its edge areas 2, 3. In the area of the extension of the sealing element 1, several pass-through holes 6 are provided. Between the sealing profiles 4, 5 and the holes 6, elements 7 with approximately hemispherical cross-section are provided, which serve for acoustic de-coupling, if the sealing element 1 is installed between resonance bodies, such as housing covers, cylinder head covers, oil covers, vacuum devices, or similar.

FIGS. 2 and 3 show cross sections through the sealing element per sections A—A and B—B of FIG. 1. Section A—A is made through one of the pass-through holes 6, and Section B—B through one of the elements 7. The sealing element 1 is supported by a metal element 8. The sealing profiles 4, 5, are recognizable. These are arranged on one face 9 as well as on the other face 10 of the sealing profile 1.

The cross section of the elements 7 is, as shown in FIG. 1, approximately hemispherical in design. The elements 7 cover more than 50% of the area bounded by the sealing profiles 4, 5. The elements 7, in this example, are of a height, relative to the sealing profiles 4, 5 that is less than 50% of the height of the sealing profiles 4, 5.

What invention claimed is:

1. A sealing element seal, comprising:
a sealing element of an elastomer material, having spaced-apart sealing profiles, between which, at given intervals, de-coupling elements that provide acoustic de-coupling, also made of elastomer material, are located; said de-coupling elements having a generally hemispherical crown and wherein the height of the de-coupling elements is approximately 30% to 50% of the height of the sealing profiles.

2. The sealing element as in claim 1, characterized in that said sealing element also includes a support element.

3. The sealing element as in claim 2, characterized in that the support element is a metal.

4. The sealing element as in claim 1, characterized in that said sealing element is a flat seal.

5. The sealing element as in claim 3, characterized in that said sealing element is a flat seal.

6. The sealing element of claim 1, characterized in that the de-coupling elements extend to the sealing profiles with a pre-determinable side clearance.

7. The sealing element as in claim 1, characterized in that the de-coupling elements occupy more than 50%, of the area between the sealing profiles.

8. The sealing element as in claim 6, characterized in that the de-coupling elements occupy more than 50% of the area between the sealing profiles.

9. The sealing element as in claim 1, including a plurality of pass-through holes, characterized in that the de-coupling elements are provided in pre-determinable segments between the pass-through holes.

10. The sealing element as in claim 1, characterized in that the sealing profiles and the elements are located on both faces of a metallic reinforcement element.

11. The sealing element as in claim 1, characterized in that the sealing profiles and the de-coupling elements are located on both faces of a metallic reinforcement element.

* * * * *